(12) United States Patent
Gao et al.

(10) Patent No.: US 11,519,715 B2
(45) Date of Patent: Dec. 6, 2022

(54) METHOD, DEVICE, APPARATUS AND STORAGE MEDIUM FOR DETECTING A HEIGHT OF AN OBSTACLE

(71) Applicant: Baidu Online Network Technology (Beijing) Co., Ltd., Beijing (CN)

(72) Inventors: Han Gao, Beijing (CN); Xun Sun, Beijing (CN); Tian Xia, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 17/303,300

(22) Filed: May 26, 2021

(65) Prior Publication Data

US 2021/0278199 A1 Sep. 9, 2021

Related U.S. Application Data

(62) Division of application No. 16/513,095, filed on Jul. 16, 2019, now Pat. No. 11,047,673.

(30) Foreign Application Priority Data

Sep. 11, 2018 (CN) .......................... 201811056945.X (51) Int. Cl.
*G01B 11/02* (2006.01)
*G05D 1/00* (2006.01)
(Continued)

(52) U.S. Cl.
CPC .......... *G01B 11/026* (2013.01); *G01B 11/022* (2013.01); *G01B 11/03* (2013.01);
(Continued)

(58) Field of Classification Search
CPC ..... G01B 11/022; G01B 11/026; G01B 11/03; G01C 11/00; G05D 1/0088; G05D 1/0246;
(Continued)

(56) References Cited

U.S. PATENT DOCUMENTS 8,611,585 B2 12/2013 Zhang et al.
9,082,014 B2 7/2015 Terrazas et al.
(Continued)

FOREIGN PATENT DOCUMENTS

CN 101441076 A 5/2009
CN 102663196 A 9/2012
(Continued)

OTHER PUBLICATIONS

Dubbelman G., et al., "Vision Based Obstacle Detection for both Day and Night Conditions," Electro Optical System, Dec. 2006, 8 pages.
(Continued)

*Primary Examiner* — Peter B Kim
(74) *Attorney, Agent, or Firm* — Patterson Thuente Pedersen, P.A.

(57) ABSTRACT

A method, device, apparatus and a computer-readable storage medium for detecting a height of an obstacle are provided. The method can include: acquiring observation data of a plurality of reference obstacles from a frame; according to the observation data of each of the reference obstacles, fitting a function F: Z=F(ymax), wherein the observation data of a reference obstacle comprises a longitudinal coordinate of a bottom of the reference obstacle in the frame, and a distance between the reference obstacle and a camera capturing the frame; and determining a distance between the obstacle to be detected and the camera, according to the longitudinal coordinate of the bottom of the obstacle in the frame and the function F; and determining an evaluation value of the height of the obstacle to be detected according to the distance between the obstacle to be detected and the camera.

9 Claims, 6 Drawing Sheets

(51) Int. Cl.
*G01B 11/03* (2006.01)
*G06V 20/58* (2022.01)

(52) U.S. Cl.
CPC ........... *G05D 1/0088* (2013.01); *G06V 20/58* (2022.01); *G06V 2201/12* (2022.01)

(58) Field of Classification Search
CPC ................ G06V 20/58; G06V 2201/12; G06T 2207/10016; G06T 2207/30261; G06T 7/60
See application file for complete search history.

(56) References Cited

U.S. PATENT DOCUMENTS

| | | | |
|---|---|---|---|
| 9,812,838 | B2 | 11/2017 | Villeneuve et al. |
| 2006/0111841 | A1 | 5/2006 | Tseng |
| 2011/0176145 | A1 | 7/2011 | Edmonds et al. |
| 2015/0249821 | A1 | 9/2015 | Tanizumi et al. |
| 2016/0144847 | A1 | 5/2016 | Mills |
| 2017/0092000 | A1 | 3/2017 | Schwimmer |
| 2017/0151883 | A1 | 6/2017 | Bae et al. |
| 2017/0261318 | A1 | 9/2017 | Takagi et al. |
| 2018/0189599 | A1 | 7/2018 | Sano et al. |
| 2020/0241549 | A1 | 7/2020 | Tsurumi et al. |

FOREIGN PATENT DOCUMENTS

| | | | | |
|---|---|---|---|---|
| CN | 103258338 | A | 8/2013 | |
| CN | 103914830 | A | 7/2014 | |
| CN | 104020674 | A | 9/2014 | |
| CN | 104183014 | A | 12/2014 | |
| CN | 104236462 | A | 12/2014 | |
| CN | 104331910 | A | 2/2015 | |
| CN | 104376297 | A | 2/2015 | |
| CN | 104457569 | A | 3/2015 | |
| CN | 104899855 | A | 9/2015 | |
| CN | 104933708 | A | 9/2015 | |
| CN | 104950883 | A | 9/2015 | |
| CN | 105761308 | A | 7/2016 | |
| CN | 105825711 | A | 8/2016 | |
| CN | 105844600 | A | 8/2016 | |
| CN | 105957145 | A | 9/2016 | |
| CN | 106204457 | A | 12/2016 | |
| CN | 106462757 | A | 2/2017 | |
| CN | 106560347 | A | 4/2017 | |
| CN | 106599832 | A | 4/2017 | |
| CN | 106845412 | A | 6/2017 | |
| CN | 106919908 | A | 7/2017 | |
| CN | 106951847 | A | 7/2017 | |
| CN | 106997049 | A | 8/2017 | |
| CN | 107063710 | A | 8/2017 | |
| CN | 107103627 | A | 8/2017 | |
| CN | 107525475 | A | * 12/2017 | ......... G01B 11/0608 |
| CN | 107657237 | A | 2/2018 | |
| CN | 107659774 | A | 2/2018 | |
| CN | 107678306 | A | 2/2018 | |
| CN | 107818293 | A | 3/2018 | |
| CN | 107832806 | A | 3/2018 | |
| CN | 107993512 | A | 5/2018 | |
| CN | 108010360 | A | 5/2018 | |
| CN | 108036730 | A | 5/2018 | |
| CN | 108156419 | A | 6/2018 | |
| CN | 108256506 | A | 7/2018 | |
| CN | 108283466 | A | 7/2018 | |
| CN | 108444390 | A | 8/2018 | |
| CN | 108492356 | A | 9/2018 | |
| EP | 2764325 | A1 | 8/2014 | |
| EP | 3346237 | A1 | 7/2018 | |
| JP | H09145362 | A | 6/1997 | |
| JP | 2004110601 | A | 4/2004 | |
| JP | 2008150006 | A | 7/2008 | |
| JP | 2012117833 | A | 6/2012 | |
| JP | 2015079223 | A | 4/2015 | |
| JP | 2016071616 | A | 5/2016 | |
| JP | 2017091273 | A | 5/2017 | |
| JP | 2018060512 | A | 4/2018 | |
| KR | 20160047087 | A | 5/2016 | |
| RO | 132599 | A2 | 5/2018 | |
| TW | 200945245 | A | 11/2009 | |
| TW | 201643063 | A | 12/2016 | |
| WO | WO-2012001755 | A1 | 1/2012 | |

OTHER PUBLICATIONS

Dubbelman G., "Vision Based Obstacle Detection for both Day and Night Conditions," Retrieved from https://staff.fnwi.uva.nl/a.visser/research/ias/alumni/m.sc.theses/theses/GijsDubbelman.pdf, Dec. 31, 2006, XP055618096, 126 pages.

European Search Report for European Application No. 19185677.2 dated Jun. 23, 2020, 9 pages.

First Office Action dated Jun. 12, 2019 for Chinese Application No. 201811056945.X, 14 pages.

Liu H., et al., "Pose alignment of aircraft structures with distance sensors and CCD cameras" Robotics and Computer-Integrated Manufacturing, Dec. 14, 2015, pp. 30-38.

Office Action for Japanese Patent Application No. 2019125582, dated Apr. 1, 2020, 6 pages.

Office Action dated Aug. 20, 2020 for Chinese Application No. 201910727517.3, filed Sep. 11, 2018, 7 pages.

Partial European Search Report for Application No. 19185677.2, dated Jan. 8, 2020, 11 pages.

Qi G.Z., et al., "Algorithms of Environment Understanding and Obstacle Based on Multisensor Data Fusion", China Academic Journal abstract Electronic Publishing House, Robot, Mar. 1998, vol. 20(2), 7 pages.

Search Report dated Jun. 5, 2019 for Chinese Application No. 201811056945.X, 5 pages.

Search Report for the Application No. 2019107275173, dated Aug. 12, 2020, 7 pages.

Weikang G., et al., "Real-Time Algorithms Study and Error Analysis on Obstacle Detection Using Range Image of Laser Range Sensor in ALV",Robot, Mar. 1997, vol. 19 (2), 8 pages.

* cited by examiner

METHOD, DEVICE, APPARATUS AND STORAGE MEDIUM FOR DETECTING A HEIGHT OF AN OBSTACLE

CROSS-REFERENCE TO RELATED APPLICATION

This application is a divisional application of U.S. patent application Ser. No. 16/513,095, filed on Jul. 16, 2019, which claims priority to Chinese Patent Application No. 201811056945.X, entitled "Method, Device, Apparatus and Storage Medium for Detecting a Height of an Obstacle," and filed on Sep. 11, 2018. All of the aforementioned applications are hereby incorporated by reference in their entireties.

TECHNICAL FIELD

The present application relates to the field of unmanned ground vehicle (UGV) technology, and in particular, to a method, device, apparatus and storage medium for detecting the height of an obstacle.

BACKGROUND

Obstacle detection is a crucial part for sensing the environment around an unmanned ground vehicle (UGV). Due to a foreshortening effect of objects in an image, which can cause a foreground object to appear larger than an object behind it, it is difficult to evaluate the actual size of an obstacle according to sizes of obstacles in the image. In particular, it is difficult to evaluate the height of an obstacle from an image frame.

SUMMARY

A method, device, apparatus and a computer-readable storage medium for detecting a height of an obstacle are provided according to embodiments of the present application, so as to at least solve the above technical problems in the existing technology.

According to a first aspect, a method for detecting a height of an obstacle can include acquiring observation data of a plurality of reference obstacles from a frame, for each reference obstacle, determining a first evaluation value of the height of the obstacle to be detected, according to the observation data of the reference obstacle, an observed height of the obstacle to be detected in a frame, a height of the reference obstacle, and a distance between a bottom of the obstacle to be detected in the frame and an optical axis of a camera capturing the frame, wherein the observation data of the reference obstacle comprises an observed height of the reference obstacle in the frame and a distance between a bottom of the reference obstacle in the frame and the optical axis of the camera, and determining a second evaluation value of the height of the obstacle to be detected by using a plurality of first evaluation values for the plurality of reference obstacles.

In embodiments, determining a first evaluation value of a height of the obstacle to be detected, according to the observation data of the reference obstacle, an observed height of the obstacle to be detected in a frame, a height of the reference obstacle, and a distance between a bottom of the obstacle to be detected in the frame and an optical axis of a camera capturing the frame can include for the i-th reference obstacle determining the first evaluation value of the height of the obstacle to be detected with a formula (4):

$$Hp = \frac{Hi}{hi} \cdot \frac{ymaxi - Cy}{ymaxp - Cy} \cdot hp \qquad (4)$$

where Hp is the first evaluation value of the height of the obstacle to be detected, hp is the observed height of the obstacle to be detected in the frame, hi is an observed height of the i-th reference obstacle in the frame, Hi is a height of the i-th reference obstacle, y max p–Cy is a distance between a bottom of the obstacle to be detected in the frame and the optical axis of the camera capturing the frame, and y max i–Cy is a distance between a bottom of the i-th reference obstacle in the frame and the optical axis of the camera.

In embodiments, determining a second evaluation value of the height of the obstacle to be detected by using a plurality of first evaluation values for the plurality of reference obstacles can include acquiring a second evaluation value of the height of the obstacle to be detected by filtering and denoising for the plurality of first evaluation values.

In embodiments, the method can include selecting an obstacle, a type of which has a fixed height and a bottom center of which is located in a preset area, as a reference obstacle, wherein the preset area is divided into a plurality of divisions in advance, each division comprising no more than one reference obstacle.

According to a second aspect, a method for detecting a height of an obstacle canb includes acquiring observation data of a plurality of reference obstacles from a frame according to the observation data of each of the reference obstacles, fitting a function F: Z=F(ymax), wherein the observation data of a reference obstacle comprises a longitudinal coordinate of a bottom of the reference obstacle in the frame, and a distance between the reference obstacle and a camera capturing the frame, wherein ymax is a longitudinal coordinate of a bottom of the reference obstacle in the frame, and Z is a distance between the reference obstacle and the camera, determining a distance between the obstacle to be detected and the camera, according to the longitudinal coordinate of the bottom of the obstacle in the frame and the function F, and determining an evaluation value of a height of the obstacle to be detected, according to the distance between the obstacle to be detected and the camera.

In embodiments determining an evaluation value of a height of the obstacle to be detected, according to the distance between the obstacle to be detected and the camera can include determining the evaluation value of the height of the obstacle to be detected with a formula (5):

$$Hp' = \frac{hp}{f} \cdot Zp \qquad (5)$$

where Hp' is the evaluation value of the height of the obstacle to be detected, hp is a observed height of the obstacle to be detected in the frame, f is a focal length of the camera, and Zp is a distance between the obstacle to be detected and the camera.

In embodiments, the method further includes selecting an obstacle, a type of which has a fixed height and a bottom center of which is located in a preset area, as a reference obstacle, wherein the preset area is divided into a plurality of divisions in advance, each division comprising no more than one reference obstacle.

According to a third aspect, a device for detecting a height of an obstacle can include a first acquiring module configured to acquire observation data of a plurality of reference obstacles from a frame a first evaluating module configured to, for each reference obstacle, determine a first evaluation value of the height of the obstacle to be detected, according to the observation data of the reference obstacle, an observed height of the obstacle to be detected in a frame, a height of the reference obstacle, and a distance between a bottom of the obstacle to be detected in the frame and an optical axis of a camera capturing the frame, wherein the observation data of the reference obstacle comprises an observed height of the reference obstacle in the frame and a distance between a bottom of the reference obstacle in the frame and the optical axis of the camera a second evaluating module configured to determine a second evaluation value of the height of the obstacle to be detected by using a plurality of first evaluation values for the plurality of reference obstacles.

In conjunction with the third aspect, in a first implementation of the third aspect of the present application, the first evaluating module is configured to, for the i-th reference obstacle, determine the first evaluation value of the height of the obstacle to be detected with a formula (4):

$$Hp = \frac{Hi}{hi} \cdot \frac{y\max i - Cy}{y\max p - Cy} \cdot hp \qquad (4)$$

where Hp is the first evaluation value of the height of the obstacle to be detected, hp is the observed height of the obstacle to be detected in the frame, hi is an observed height of the i-th reference obstacle in the frame, Hi is a height of the i-th reference obstacle, y max p–Cy is a distance between a bottom of the obstacle to be detected in the frame and the optical axis of the camera capturing the frame, and y max i–Cy is a distance between a bottom of the i-th reference obstacle in the frame and the optical axis of the camera.

In embodiments, the second evaluating module is configured to acquire a second evaluation value of the height of the obstacle to be detected by filtering and denoising for the plurality of first evaluation values.

In embodiments, the first acquiring module is further configured to select an obstacle, a type of which has a fixed height and a bottom center of which is located in a preset area, as a reference obstacle, wherein the preset area is divided into a plurality of divisions in advance, each division comprising no more than one reference obstacle.

According to a fourth aspect, a device for detecting a height of an obstacle can include a second acquiring module configured to acquire observation data of a plurality of reference obstacles from a frame, a function fitting module configured to, according to the observation data of each of the reference obstacles, fit a function F: Z=F(ymax), wherein the observation data of a reference obstacle comprises a longitudinal coordinate of a bottom of the reference obstacle in the frame, and a distance between the reference obstacle and a camera capturing the frame, where ymax is a longitudinal coordinate of a bottom of the reference obstacle in the frame Z is a distance between the reference obstacle and the camera. A distance evaluating module can be configured to determine a distance between the obstacle to be detected and the camera, according to the longitudinal coordinate of the bottom of the obstacle in the frame and the function F. A height evaluating module can be configured to determine an evaluation value of a height of the obstacle to be detected, according to the distance between the obstacle to be detected and the camera.

In embodiments, the height evaluating module can be configured to determine the evaluation value of the height of the obstacle to be detected with a formula (5):

$$Hp' = \frac{hp}{f} \cdot Zp \qquad (5)$$

where Hp' is the evaluation value of the height of the obstacle to be detected, hp is a observed height of the obstacle to be detected in the frame, f is a focal length of the camera, and Zp is a distance between the obstacle to be detected and the camera.

In embodiments, the second acquiring module can be further configured to select an obstacle, a type of which has a fixed height and a bottom center of which is located in a preset area, as a reference obstacle, wherein the preset area is divided into a plurality of divisions in advance, each division comprising no more than one reference obstacle.

The above technical solutions may have a number of advantages or beneficial effects including that by using observation data of the reference obstacles as a reference, a road geometry can be modeled to achieve to evaluate a height of an obstacle to be detected, thereby detecting the 3D dimension of the obstacle to be detected.

The above summary is for the purpose of the specification only and is not intended to be limiting in any way. In addition to the illustrative aspects, embodiments, and features described above, further aspects, embodiments, and features of the present application will be readily understood by reference to the drawings and the following detailed description.

BRIEF DESCRIPTION OF THE DRAWINGS

In the drawings, unless otherwise specified, identical reference numerals will be used throughout the drawings to refer to identical or similar parts or elements. The drawings are not necessarily drawn to scale. It should be understood that these drawings depict only some embodiments disclosed in accordance with the present application and are not to be considered as limiting the scope of the present application.

DETAILED DESCRIPTION

In the following, only certain example embodiments are described. As those skilled in the art would realize, the described embodiments may be modified in various different ways, all without departing from the spirit or scope of the present application. Accordingly, the drawings and description are to be regarded as illustrative in nature and not restrictive.

Two methods and two devices for detecting a height of an obstacle are provided in embodiments of the present disclosure. Details of technical solutions are described below with reference to following embodiments.

Embodiment 1

Figure 1:
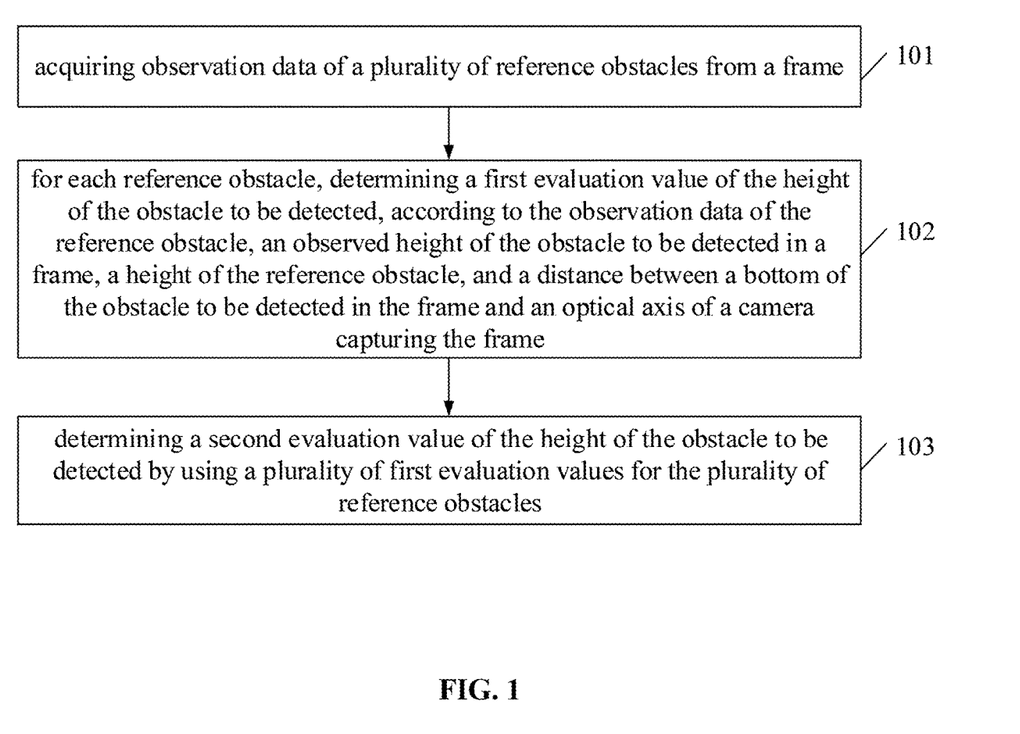
FIG. 1 is a flowchart showing a method for detecting a height of an obstacle according to an embodiment of the present application.

A method for detecting a height of an obstacle is provided according to an embodiment of the present application. FIG. 1 is a flowchart depicting a method for detecting a height of an obstacle. At 101, observation data of a plurality of reference obstacles can be acquired from a frame, such as an imaging frame.

The observation data of a reference obstacle can be directly obtained in the frame or acquired by sensors. Before this activity a reference obstacle can be selected. One method for selecting a reference obstacle is provided below. At 102, for each reference obstacle a first evaluation value of the height of the obstacle to be detected can be determined according to the observation data of the reference obstacle, an observed height of the obstacle to be detected in a frame, a height of the reference obstacle, and a distance between a bottom of the obstacle to be detected in the frame and an optical axis of a camera capturing the frame, wherein the observation data of the reference obstacle can comprise an observed height of the reference obstacle in the frame and a distance between a bottom of the reference obstacle in the frame and the optical axis of the camera.

Figure 2:
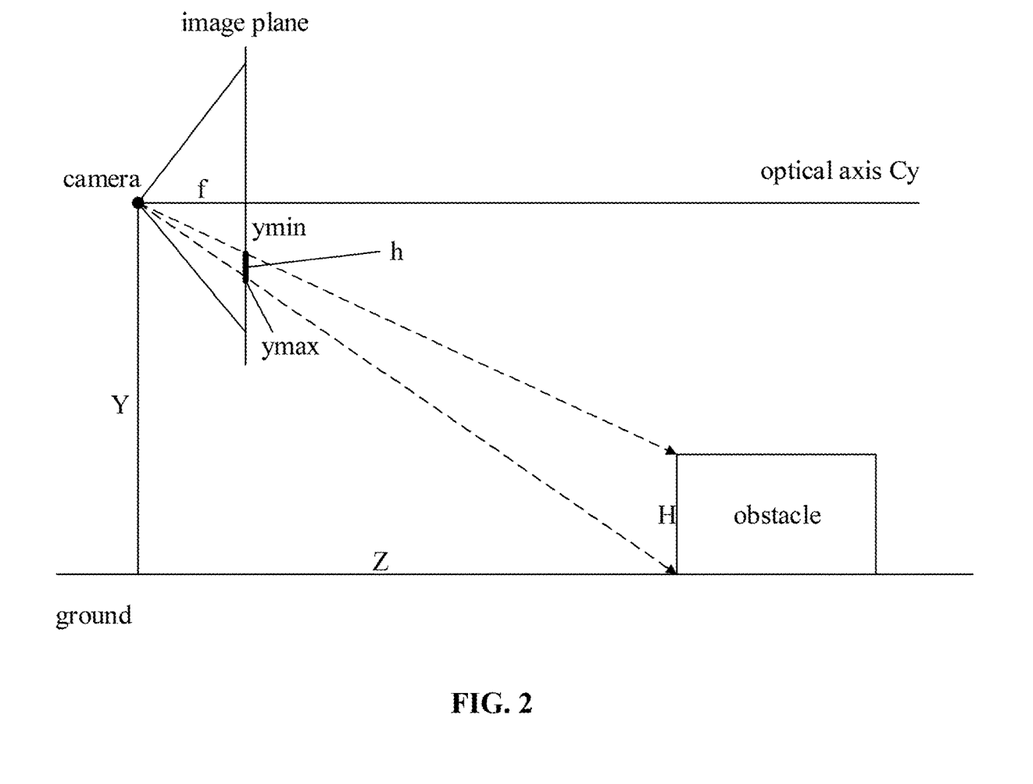
FIG. 2 is a schematic diagram depicting an obstacle captured and imaged by a camera according to an embodiment of the present application.

FIG. 2 is a schematic diagram depicting the capturing and imaging of an obstacle by a camera according to an embodiment of the present application. Referring to FIG. 2, the obstacle in FIG. 2 may be a reference obstacle or the obstacle to be detected. The reference labels depicted in FIG. 2 can represent the following:

H is a height of an obstacle;

h is the observed height of the obstacle in a frame;

ymax is a longitudinal coordinate of the bottom of the obstacle in the frame;

ymin is a longitudinal coordinate of the top of the obstacle in the frame;

therefore, h=ymax−ymin;

Cy is a longitudinal coordinate of an optical axis of a camera capturing the frame; therefore, a distance between the bottom of the obstacle in the frame and the optical axis is: ymax−Cy;

Y is a distance between the camera and the ground;

f is a focal length of the camera; and

Z is a distance between the obstacle and the camera.

Through geometric relationship of each of points and lines in FIG. 2, variables corresponding to the above reference marks have the following relationship:

$$\frac{f}{Z} = \frac{h}{H} = \frac{y\max - Cy}{Y}.$$

Then, for the i-th reference obstacle, there is a formula (1) below:

$$\frac{hi}{Hi} = \frac{y\max i - Cy}{Y} \qquad (1)$$

wherein hi is an observed height of the i-th reference obstacle in a frame;

Hi is a height of the i-th reference obstacle;

ymaxi is a longitudinal coordinate of a bottom of the i-th reference obstacle in the frame;

Cy is a longitudinal coordinate of an optical axis of a camera capturing the frame;

Y is a distance between the camera and the ground.

For the obstacle to be detected, there is a formula (2) below:

$$\frac{hp}{Hp} = \frac{y\max p - Cy}{Y} \qquad (2)$$

wherein hp is an observed height of the obstacle to be detected in a frame;

Hp is a height of the obstacle to be detected;

ymaxp is a longitudinal coordinate of a bottom of the obstacle to be detected in the frame;

Cy is a longitudinal coordinate of an optical axis of a camera capturing the frame;

Y is a distance between the camera and the ground.

Then, a formula (3) can be acquired by dividing the formula (1) by the formula (2):

$$\frac{hi}{Hi} \cdot \frac{hp}{Hp} = \frac{y\max i - Cy}{y\max p - Cy} \qquad (3)$$

Further, according to the formula (3), a formula (4) for calculating Hp can be derived:

$$Hp = \frac{Hi}{hi} \cdot \frac{y\max i - Cy}{y\max p - Cy} \cdot hp \qquad (4)$$

wherein Hp is a first evaluation value of a height of an obstacle to be detected;

hp is an observed height of the obstacle to be detected in a frame;

hi is an observed height of the i-th reference obstacle in the frame;

Hi is a height of the i-th reference obstacle;

y max p−Cy is a distance between a bottom of the obstacle to be detected in the frame and an optical axis of a camera capturing the frame; and y max i−Cy is a distance between a bottom of the i-th reference obstacle in the frame and the optical axis of the camera.

Therefore, for each reference obstacle, a first evaluation value of the height of the obstacle to be detected may be determined according to the observed height of the obstacle to be detected in the frame, the observed height of the reference obstacle in the frame image, the height of the reference obstacle, the distance between the bottom of the obstacle to be detected in the frame and the optical axis of the camera, and the distance between the bottom of the reference obstacle in the frame and the optical axis of the camera.

At 102, because the frames differ from each other, the first evaluation values of the height of the obstacle to be detected as determined may be different for different frames. It can therefore be necessary to determine a second evaluation value of the height of the obstacles to be detected, for example, at 103.

At 103 a second evaluation value of the height of the obstacle to be detected can be determined by using a plurality of first evaluation values for the plurality of reference obstacles.

At 103, a process of filtering and denoising can be performed to the determined first evaluation values to acquire a second evaluation value of the height of the obstacle to be detected. Particularly, after the filtering and denoising, a first evaluation value which is a middle, average, mean, or other value of the first evaluation values or another suitable first evaluation value may be used as the second evaluation value of the height of the obstacle to be detected.

Through the method proposed in the embodiment of the present application, by using observation data of a plurality of reference obstacles as a reference, a height of an obstacle to be detected can be determined. Then a 3D dimension of the obstacle to be detected can also be determined.

Embodiment 2

A method for selecting reference obstacles is described in this embodiment of the application. Before the acquiring observation data of a plurality of reference obstacles, the method can further include selecting an obstacle, a type of which has a fixed height and a bottom center of which is located in a preset area, as a reference obstacle, wherein the preset area is divided into a plurality of divisions in advance, each division comprising no more than one reference obstacle.

In embodiments, the selecting of a reference obstacle can include two conditions:

1. Type of an obstacle

An obstacle can be used as a reference obstacle when the type thereof has a fixed height. Here, "fixed height" means that the type of obstacle has a height with a minor fluctuation, i.e. within a preset threshold. In practical applications, the height of a car and a minivan can be considered to be fixed and thus can be used as a reference obstacle. However, a height of a truck, a bus, a traffic cone, and the like may be too variable to be used as a reference obstacle. The height of an obstacle can be evaluated by using the methods proposed herein.

2. Location of an Obstacle:

The reference obstacle should be located in a plurality of consecutive frames before the current frame in which the obstacle to be detected is located.

Further, to assist with accurate evaluation, a preset area may be predetermined in a frame and an obstacle with a bottom center located in the preset area in the frame is used as a reference obstacle. The preset area can be divided into a plurality of divisions in advance (for example, one division comprises 50 pixels), and no more than one reference obstacle is included in each division. The shapes of the divisions need not be restricted.

Figure 3:
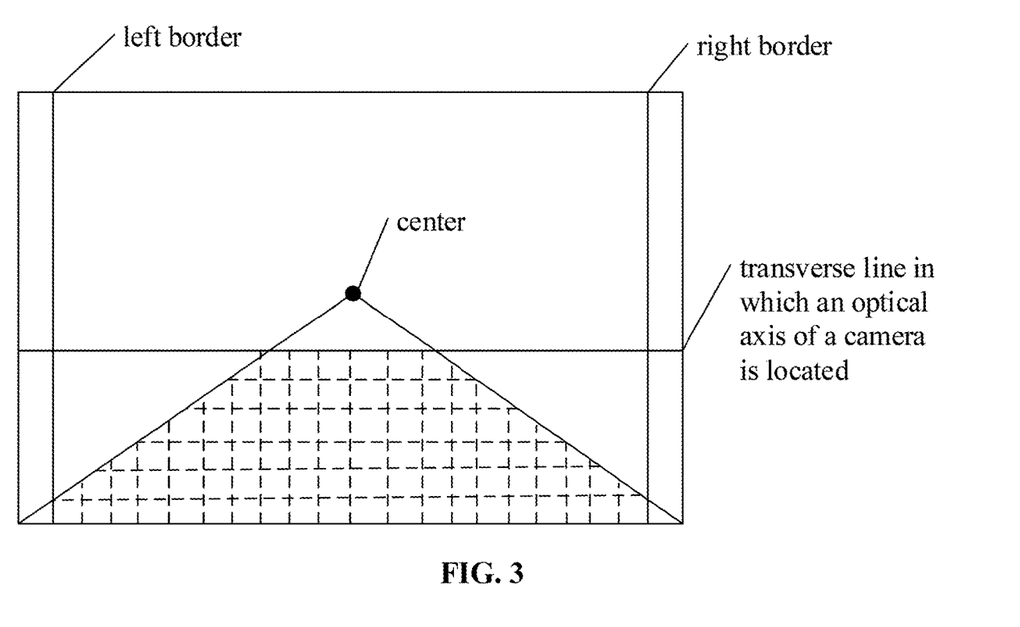
FIG. 3 is a schematic diagram depicting a method for dividing a preset area according to an embodiment of the present application.

FIG. 3 is a schematic diagram depicting a dividing mode of a preset area according to an embodiment. The preset area can be divided into a plurality of divisions by the following activities:

1) obtaining a triangular area formed by a center, a lower left corner, and a lower right corner of a frame.

2) cutting the triangular area by a transverse line in which an optical axis of a camera capturing the frame is located in the frame, a left border and a right border of the frame, and determining, in the triangular area, a part below the transverse line, from the left border to the right border of the frame as the preset area (such as the square-filled area in FIG. 3).

In FIG. 3, the optical axis of the camera is below the center point. When the optical axis of the camera is above the center point, because the triangular area is below the optical axis of the camera, the triangle area cannot be cut by the transverse line.

Two conditions for selecting a reference obstacle are described above. According to these two conditions, a plurality of reference obstacles can be selected, and no more than one reference obstacle is included in each division of the preset areas. The height of the obstacle to be detected can be detected by using the reference obstacles.

The reference obstacles in the preset area can be updated. When an obstacle appears for the first time in a division and a type thereof has a fixed height, this obstacle is used as a reference obstacle. When a new obstacle appears in the division and a type thereof has a fixed height, according to the specific situation, the previously determined reference obstacle in the division may be retained or the later determined obstacle may be used as a new reference obstacle in the division instead of the previously determined reference obstacle.

Embodiment 3

Figure 4:
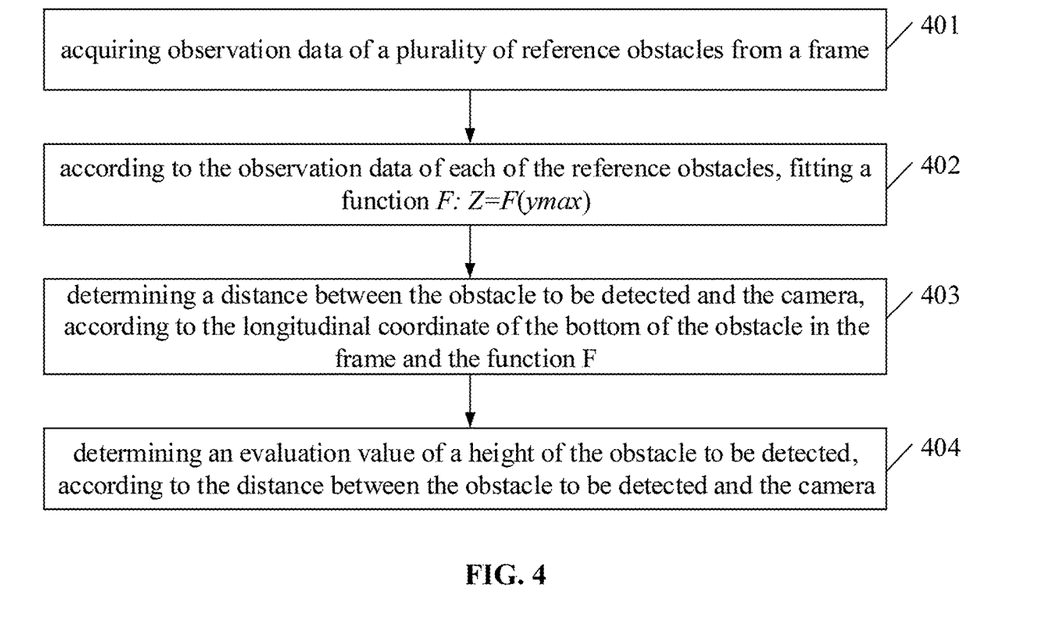
FIG. 4 is a flowchart depicting a method for detecting a height of an obstacle according to an embodiment of the present application.

FIG. 4 is a flowchart depicting a method for detecting a height of an obstacle according to an embodiment. At 401, observation data of a plurality of reference obstacles can be acquired from a frame. Observation data of a plurality of reference obstacles can be directly observed from the frame or acquired by sensors.

A reference obstacle can be selected prior to 401. The method for selecting a reference obstacle can be identical with that described in the above Embodiment 2 of the present application and thus the description thereof is omitted herein.

At 402, a function F: Z=F(ymax) can be fit according to the observation data of each of the reference obstacles, where the observation data of a reference obstacle comprises a longitudinal coordinate of a bottom of the reference obstacle in the frame, and a distance between the reference obstacle and a camera capturing the frame, where ymax is a longitudinal coordinate of the reference obstacle in the frame and Z is a distance between the reference obstacle and the camera.

For i reference obstacles, i sets of data (Z1, ymax1), (Z2, ymax2), (Zi, ymaxi) can be acquired, where Z1, Z2, Zi are the distances between the first, second, . . . i reference obstacle and the camera, respectively and ymax1, ymax2, ymaxi are longitudinal coordinates of a bottom of the first, second, . . . i reference obstacle in the frame, respectively.

According to the above i sets of data, a function F: Z=F (ymax) can be fitted. As the reference obstacles are constantly updated, the function F can also be continually updated.

At 403 a distance between the obstacle to be detected and the camera can be determined according to the longitudinal coordinate of the bottom of the obstacle in the frame and the function F.

The longitudinal coordinate of the bottom of the obstacle to be detected (i.e., ymaxp) may be substituted into the function Z=F(ymax) to determine the distance between the obstacle to be detected and the camera (i.e., Zp).

At 404 an evaluation value of a height of the obstacle to be detected can be determined, according to the distance between the obstacle to be detected and the camera.

The geometric relationship $$\frac{f}{Z} = \frac{h}{H}$$

in FIG. 2 can be determined with a formula (5):

$$Hp' = \frac{hp}{f} \cdot Zp \quad (5)$$

where Hp' is a second evaluation value of a height of an obstacle to be detected, hp is an observed height of the obstacle to be detected in a frame, f is a focal length of a camera, and Zp is a distance between the obstacle to be detected and the camera.

Through the method proposed in this embodiment, by using observation data of a plurality of reference obstacle as a reference, a height of an obstacle to be detected can be determined, and a 3D dimension of the obstacle to be detected can also be determined.

Embodiment 4

Figure 5:
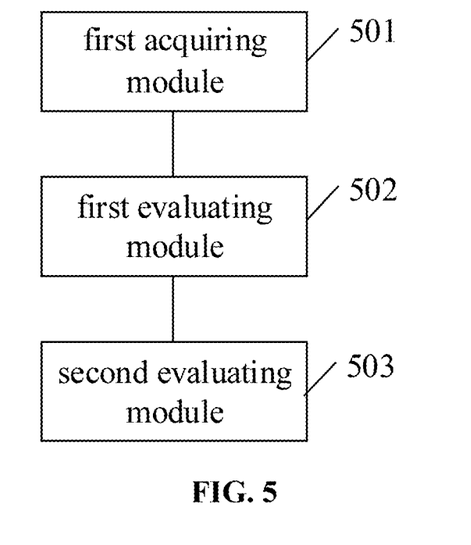
FIG. 5 is a schematic structural diagram depicting a device for detecting a height of an obstacle according to an embodiment of the present application.

FIG. 5 is a schematic diagram depicting the structure of a device for detecting a height of an obstacle according to an embodiment.

A first acquiring module 501 can be configured to acquire observation data of a plurality of reference obstacles from a frame.

A first evaluating module 502 can be configured to, for each reference obstacle, determine a first evaluation value of the height of the obstacle to be detected, according to the observation data of the reference obstacle, an observed height of the obstacle to be detected in a frame, an actual height of the reference obstacle, and a distance between a bottom of the obstacle to be detected in the frame and an optical axis of a camera capturing the frame, wherein the observation data of the reference obstacle comprises an observed height of the reference obstacle in the frame and a distance between a bottom of the reference obstacle in the frame and the optical axis of the camera.

A second evaluating module 503 can be configured to determine a second evaluation value of the height of the obstacle to be detected by using a plurality of first evaluation values for the plurality of reference obstacles.

The above first evaluating module 503 can be configured to, for the i-th reference obstacle, determine the first evaluation value of the height of the obstacle to be detected with a formula (4):

$$Hp = \frac{Hi}{hi} \cdot \frac{ymaxi - Cy}{ymaxp - Cy} \cdot hp \quad (4)$$

where Hp is the first evaluation value of the height of the obstacle to be detected, hp is the observed height of the obstacle to be detected in the frame, hi is an observed height of the i-th reference obstacle in the frame, Hi is an actual height of the i-th reference obstacle, y max p–Cy is a distance between a bottom of the obstacle to be detected in the frame and the optical axis of the camera capturing the frame, and y max i–Cy is a distance between a bottom of the i-th reference obstacle in the frame and the optical axis of the camera.

The second evaluating module 503 can be configured to acquire a second evaluation value of the height of the obstacle to be detected by filtering and denoising for the plurality of first evaluation values.

The above first acquiring module 501 can be further configured to select an obstacle, a type of which has a fixed height and a bottom center of which is located in a preset area, as a reference obstacle, wherein the preset area is divided into a plurality of divisions in advance, each division comprising no more than one reference obstacle.

The method for selecting a reference obstacle by the first acquiring module 501 can be the identical with the method described in the above Embodiment 2 of the present application and thus the description thereof is omitted herein.

Through the device for a height of an obstacle proposed in the embodiment of the present application, by using observation data of reference obstacles as a reference, a height of an obstacle to be detected can be determined, and then a 3D dimension of the obstacle to be detected can also be determined.

Embodiment 5

Figure 6:
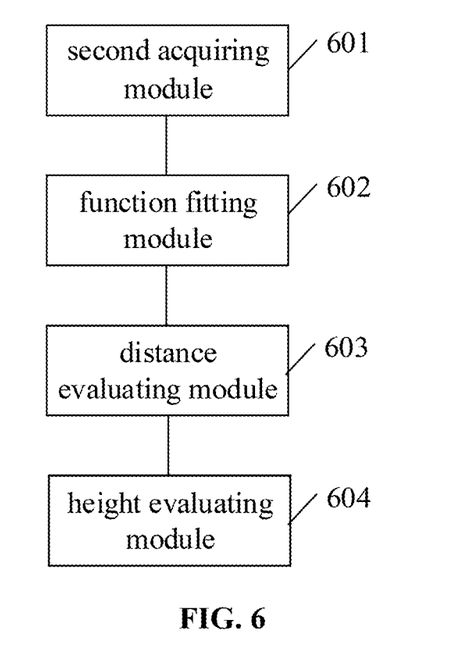
FIG. 6 is a schematic structural diagram of a device for detecting a height of an obstacle according to an embodiment of the present application.

FIG. 6 is a schematic diagram of a depicting a device for detecting a height of an obstacle according to Embodiment 5 of the present application.

A second acquiring module 601 can be configured to acquire observation data of a plurality of reference obstacles from a frame;

A function fitting module 602 can be configured to, according to the observation data of each of the reference obstacles, fit a function F: Z=F(ymax), where the observation data of a reference obstacle comprises a longitudinal coordinate of a bottom of the reference obstacle in the frame, and a distance between the reference obstacle and a camera capturing the frame, ymax is a longitudinal coordinate of a bottom of the reference obstacle in the frame; and Z is a distance between the reference obstacle and the camera.

As the reference obstacles are constantly updated, the function F can be continually updated.

A distance evaluating module 603 can be configured to determine a distance between the obstacle to be detected and the camera, according to the longitudinal coordinate of the bottom of the obstacle in the frame and the function F.

A height evaluating module 604 can be configured to determine an evaluation value of a height of the obstacle to be detected, according to the distance between the obstacle to be detected and the camera.

The height evaluation module 604 can be configured to determine the evaluation value of the height of the obstacle to be detected with formula (5):

$$Hp' = \frac{hp}{f} \cdot Zp \quad (5)$$

where Hp' is the evaluation value of the height of the obstacle to be detected, hp is a observed height of the obstacle to be detected in the frame, f is a focal length of the camera and, Zp is a distance between the obstacle to be detected and the camera.

The second acquiring module 601 can be further configured to select an obstacle, a type of which has a fixed height and a bottom center of which is located in a preset area, as a reference obstacle, wherein the preset area is divided into a plurality of divisions in advance, each division comprising no more than one reference obstacle.

The method for selecting a reference obstacle by the first acquiring module 501 can be identical to the method described in the above Embodiment 2 and thus the description thereof is omitted herein.

Through the device for a height of an obstacle proposed in the embodiment, by using observation data of reference obstacles as a reference, a height of an obstacle to be detected can be determined, and then a 3D dimension of the obstacle to be detected can also be determined.

Embodiment 6

Figure 7:
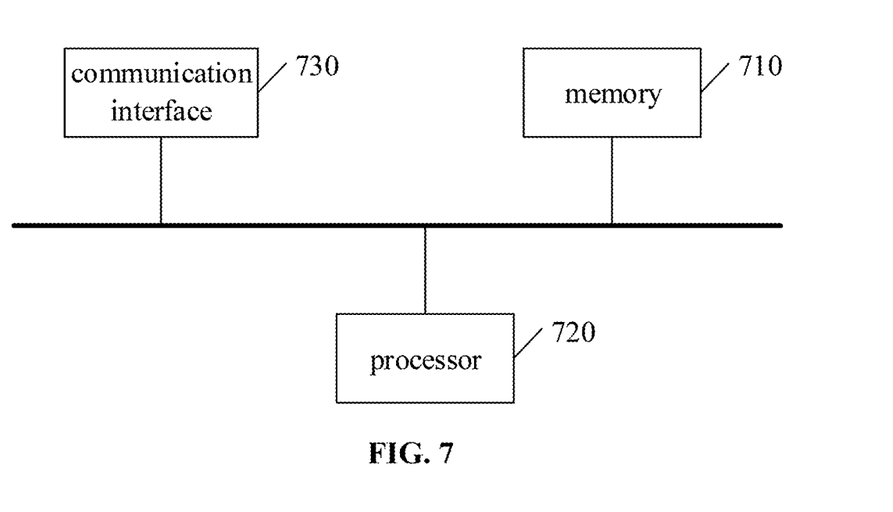
FIG. 7 is a schematic structural diagram of an apparatus for detecting a height of an obstacle according to an embodiment of the present application.

FIG. 7 is a schematic diagram depicting the structure of an apparatus for detecting a height of an obstacle according to Embodiment 5 of the present application. The apparatus includes a memory 710 and a processor 720. The memory 710 stores a computer program executable on the processor 720. When the processor 720 executes the computer program, the method for detecting a height of an obstacle in the foregoing embodiment is implemented. The apparatus can comprise one or more of each of memory 710 and processor 720.

The apparatus can further include a communication interface 730 configured to communicate with an external device and exchange data.

The memory 710 may include a high-speed RAM memory and may also include a non-volatile memory, such as at least one magnetic disk memory, or solid-state drive (SSD) memory.

If the memory 710, the processor 720, and the communication interface 730 are implemented independently, the memory 710, the processor 720, and the communication interface 730 may be connected to each other through a bus and communicate with one another. The bus may be an Industry Standard Architecture (ISA) bus, a Peripheral Component (PCI) bus, an Extended Industry Standard Component (EISA) bus, or the like. The bus may be divided into an address bus, a data bus, a control bus, and the like. For ease of illustration, only one bold line is shown in FIG. 7, but it does not mean that there is only one bus or one type of bus.

Optionally, in a specific implementation, if the memory 710, the processor 720, and the communication interface 730 are integrated on one chip, the memory 710, the processor 720, and the communication interface 730 may implement mutual communication through an internal interface.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically acquire the program, which is then stored in a computer memory.

It should be understood that various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

In summary, the method, the device, the apparatus and the storage medium for detecting the height of the obstacle is proposed in the embodiment of the present invention. An obstacle (for example, a car, a minivan, and the like), a type of which has a fixed height, is used as a reference obstacle. By using observation data of the reference obstacle as a reference, the road geometry is modeled to achieve to evaluate the height of the obstacles to be detected (such as a buses, a truck, a traffic cone, and the like, a type of which has a height with a large fluctuation), thereby detecting the 3D dimension of the obstacle to be detected.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A computer-implemented method for detecting a height of an obstacle to be detected, comprising:
   capturing, with a camera, a plurality of image frames depicting the obstacle to be detected;
   selecting a plurality of reference obstacles depicted in a frame of the plurality of image frames, each reference obstacle having a known height and located in a plurality of consecutive image frames prior to the frame;
   acquiring observation data of the plurality of reference obstacles from the frame;
   according to the observation data of each of the reference obstacles, fitting a function F:

$Z=F(ymax)$, where the observation data of each of the reference obstacles comprises a longitudinal coordinate of a bottom of the reference obstacle in the frame, and a distance between the reference obstacle and the camera, and
   where ymax is a longitudinal coordinate of a bottom of the reference obstacle in the frame, and Z is a distance between the reference obstacle and the camera;
   determining a distance between the obstacle to be detected and the camera, according to the longitudinal coordinate of the bottom of the obstacle to be detected in the frame and the function F; and
   determining an evaluation value of a height of the obstacle to be detected, according to the distance between the obstacle to be detected and the camera.

2. The method according to claim 1, wherein determining the evaluation value of the height of the obstacle to be detected, according to the distance between the obstacle to be detected and the camera comprises:
   determining the evaluation value of the height of the obstacle to be detected with the following equation:

$$Hp' = \frac{hp}{f} \cdot Zp$$

where Hp' is the evaluation value of the height of the obstacle to be detected;
   hp is a observed height of the obstacle to be detected in the frame;
   f is a focal length of the camera; and
   Zp is a distance between the obstacle to be detected and the camera.

3. The method according to claim 1, wherein
   each of the reference obstacles further has a bottom center located in a preset area the preset area divided into a plurality of divisions in advance, such that each division comprises no more than one reference obstacle.

4. A device for detecting a height of an obstacle to be detected, comprising:
   one or more processors;
   a camera; and,
   a non-transitory storage device configured for storing one or more programs, wherein the one or more programs are executed by the one or more processors to enable the one or more processors to:
   cause the camera to capture a plurality of image frames depicting the obstacle to be detected;
   select a plurality of reference obstacles depicted in a frame of the plurality of image frames, each reference obstacle having a known height and located in a plurality of consecutive image frames prior to the frame;
   acquire observation data of the plurality of reference obstacles from the frame;
   according to the observation data of each of the reference obstacles, fit a function F: $Z=F(ymax)$,
   wherein the observation data of each of the reference obstacles comprises a longitudinal coordinate of a bottom of the reference obstacle in the frame, and a distance between the reference obstacle and the camera;
   wherein ymax is a longitudinal coordinate of a bottom of the reference obstacle in the frame; and
   Z is a distance between the reference obstacle and the camera;
   determine a distance between the obstacle to be detected and the camera, according to the longitudinal coordinate of the bottom of the obstacle to be detected in the frame and the function F; and
   determine an evaluation value of a height of the obstacle to be detected, according to the distance between the obstacle to be detected and the camera.

5. The device according to claim 4, wherein the one or more programs are executed by the one or more processors to enable the one or more processors to: determine the evaluation value of the height of the obstacle to be detected with the following equation:

$$Hp' = hp/f \cdot Zp$$

where Hp' is the evaluation value of the height of the obstacle to be detected;

hp is a observed height of the obstacle to be detected in the frame;

f is a focal length of the camera; and

Zp is a distance between the obstacle to be detected and the camera.

6. The device according to claim 4, wherein each of the reference obstacles further has a bottom center of which is located in a preset area, the preset area divided into a plurality of divisions in advance, such that each division no more than one reference obstacle.

7. A non-transitory computer-readable storage medium, in which a computer program is stored, wherein the computer program is executed by a processor to enable the processor to:

capture, with a camera, a plurality of image frames depicting the obstacle to be detected;

select a plurality of reference obstacles depicted in a frame of the plurality of image frames, each reference obstacle having a known height and located in a plurality of consecutive image frames prior to the frame;

acquire observation data of the plurality of reference obstacles from the frame;

according to the observation data of each of the reference obstacles, fit a function:

$$F: Z = F(ymax),$$

wherein the observation data of each of the reference obstacles comprises a longitudinal coordinate of a bottom of the reference obstacle in the frame, and a distance between the reference obstacle and the camera;

wherein ymax is a longitudinal coordinate of a bottom of the reference obstacle in the frame; and Z is a distance between the reference obstacle and the camera;

determine a distance between the obstacle to be detected and the camera, according to the longitudinal coordinate of the bottom of the obstacle to be detected in the frame and the function F; and determine an evaluation value of a height of the obstacle to be detected, according to the distance between the obstacle to be detected and the camera.

8. The storage medium according to claim 7, wherein the computer program is executed by the processor to enable the processor to: determine the evaluation value of the height of the obstacle to be detected with the following equation:

$$Hp' = \frac{hp}{f} \cdot Zp$$

wherein Hp' is the evaluation value of the height of the obstacle to be detected;

hp is a observed height of the obstacle to be detected in the frame;

f is a focal length of the camera; and

Zp is a distance between the obstacle to be detected and the camera.

9. The storage medium according to claim 7, wherein each of the reference obstacles further has a bottom center located in a preset area, the preset area divided into a plurality of divisions in advance, such that each division comprises no more than one reference obstacle.

* * * * *